United States Patent Office 2,920,029
Patented Jan. 5, 1960

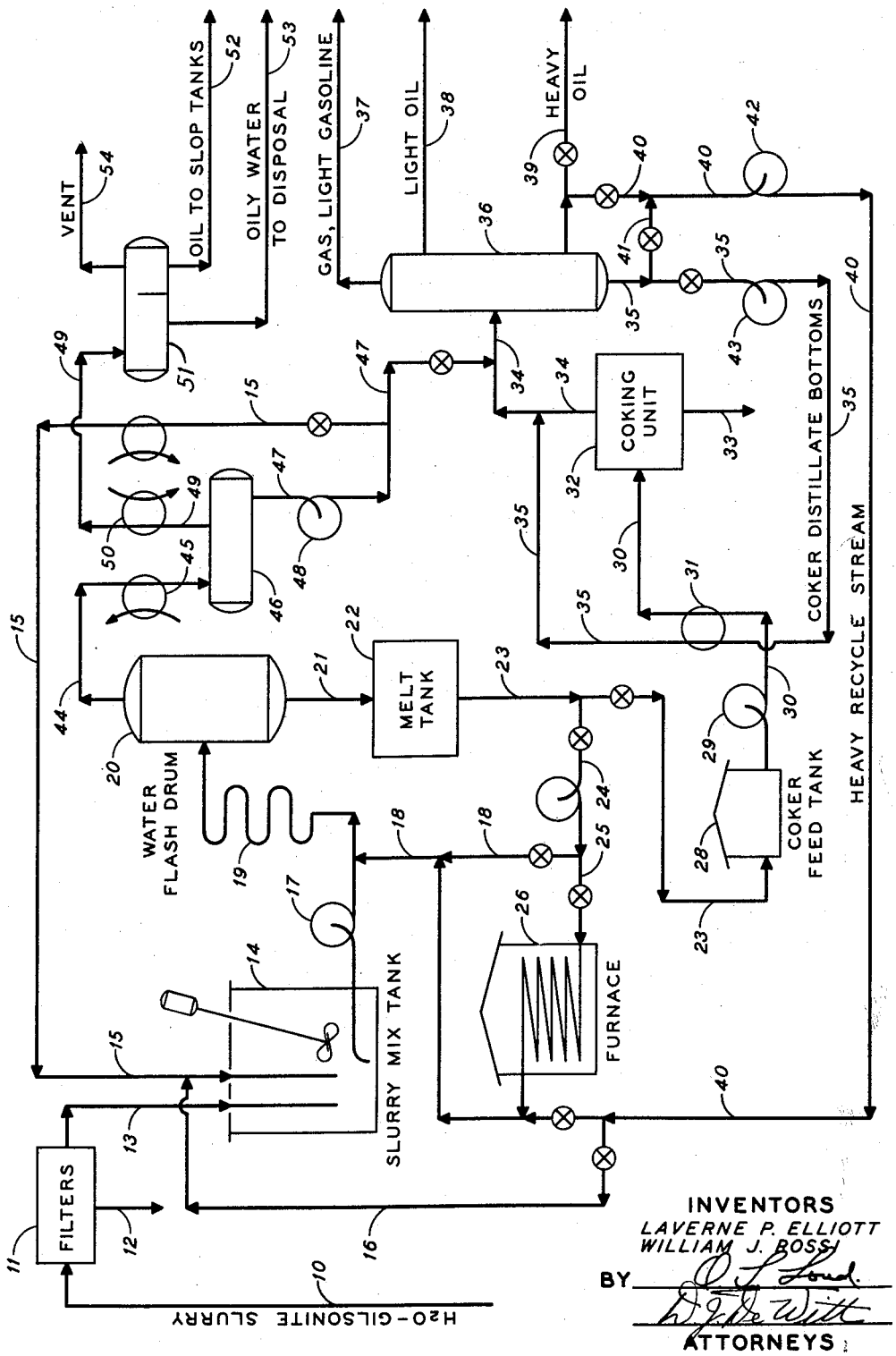

2,920,029

METHOD FOR RECOVERING GILSONITE FROM GILSONITE-WATER MIXTURES

Laverne P. Elliott and William J. Rossi, Berkeley, Calif., assignors to California Research Corporation, San Francisco, Calif., a corporation of Delaware Application December 26, 1956, Serial No. 630,697

5 Claims. (Cl. 208—41)

This invention relates to a method for removing asphaltic materials present in a mixture thereof with water.

It has been found convenient to handle various high melting, normally solid materials such, for example, as the various natural and synthetic asphalts and asphaltites, in the form of a suspension of slurry of finely divided particles in water. However, the recovery of these materials from the aqueous system presents serious problems, particularly when the normally solid material is to be converted or otherwise processed at temperatures well above the melting point thereof. Thus, while the solid product can be filtered from the system, the residual water content of the filter cake is still so high as to give rise to serious foaming and other hydrocarbon entrainment difficulties as the wet material is thereafter melted or admixed with a high boiling oil for further processing.

While the invention is broadly applicable to the treatment of a variety of asphaltic products, it has been found to be of particular utility in the processing of aqueous slurries of an asphaltite product commonly known as gilsonite. Accordingly, for the sake of greater clarity the invention will be more fully described hereinafter as it relates to the processing of a water-gilsonite feed mixture.

The present invention is based on the discovery that gilsonite or other asphaltic particles present in a water mixture can be recovered in the form of a solution in a relatively heavy hydrocarbon oil by a procedure involving the following interrelated steps: The incoming aqueous-asphaltic mixture, if not already low in water content, is first filtered or otherwise processed to form a cake in which the water has been reduced to within a range of from about 10% to 30%, preferably about 18% to 22%. This cake is then admixed with a quantity of an oil (which may be either light, medium or heavy in character) sufficient to provide a readily pumpable slurry, it surprisingly having been found that the added oil is capable of readily wetting the gilsonite or other asphaltic particles present even in the presence of water. The amount of oil added at this point is preferably from about 0.3 to 2.0 pounds per pound of the filter cake, while the temperature thereof should be sufficiently high as to give fluidity to the mass while not raising the temperature thereof above the boiling point of water.

As the next step in the process, the oil-gilsonite-water slurry is pumped from the slurry mix tank into contact with a hot, circulating heavy oil stream (which may itself contain dissolved gilsonite or other asphaltic components) in a conduit or other confined zone, the amount and temperature of said heavy oil stream being such as to bring the temperature of the resulting mixture into a range of from about 350 to 650° F. The hot mixture so obtained, which is now preferably under elevated pressures, is then passed into a flash drum or other container from which the water present in the mixture and any relatively light oils contained therein are taken overhead in the vapor phase. The remaining gilsonite-oil mixture or solution is recovered as a bottoms stream which thereafter can be processed in any desired fashion, as by passage to a coker or other hydrocarbon conversion zone.

A surprising feature of this method of operation is that the water and light oil components of the mixture are readily disengaged and taken overhead as a vapor product without giving rise to foaming and other associated oil-entrainment difficulties. This minimizes the use of a foam suppressant and greatly simplifies the problem of recovering the oil taken as vaporous overhead from the flash drum inasmuch as the temperature and pressure of said overhead stream are sufficiently high as to permit of the efficient utilization of a staged condensation system. Of great value in this method of operation, also, is the fact that introduction of the wet material into the rapidly circulating hot oil stream results in smooth and uniform vaporization of the water component without the severe bumping encountered when such material is introduced into a body of hot oil that is not being strongly agitated.

More particularly, it forms a preferred feature of the present invention that the overhead from the flash drum mentioned above is thereafter cooled and condensed under such conditions that a substantially non-aqueous, light oil product is obtained in a first stage, which product may be recycled in whole or in part, if desired, for admixture with the water-gilsonite filter cake in the slurry mix tank. Any portions of the light oil not so utilized can be employed as such for various product applications or they may be subjected to one or more catalytic or thermal treatments whereby the oil is converted to gasoline and other relatively light product fractions. The water and any remaining oil present in the vaporous effluent from the first condensation zone are thereafter subjected to further cooling and are then discharged from the system, normally as waste condensate fractions.

As stated above, the oil admixed with the gilsonite-water filter cake to form a pumpable slurry may be of any desired type boiling above about 250° F. Thus, good results can be obtained with relatively light oils which may in large part be taken overhead with the water from the flash drum, thus constituting a readily available recycle stream for return to the slurry mix tank. However, it is also possible to employ a heavier (i.e., higher boiling) oil for this purpose, in which event the amount of oil vaporized in the flash drum and taken overhead therefrom with the water vapor may be relatively small. If desired, it is possible to employ essentially the same heavy oil stream for use in the slurry mix tank as may also be employed, at least in part, to bring said slurry to the desired temperature preparatory to discharging the same into the flash drum.

The term "heavy oil," as employed herein, is defined as an oil boiling above about 600° F., and preferably above 650° F., the heavy oil commonly employed in the present process being a gas oil boiling above about 650° F. and having an end point between about 800° and 1100° F. as recovered from the liquid product obtained on subjecting the oil-gilsonite stream to a coking or other conversion operation. However, since the quantity and temperature of heavy oil available from such an operation will generally not suffice to bring the slurry to the desired 350–650° F. temperature, the preferred practice is to recycle a portion of the oil-gilsonite solution withdrawn as bottoms from the flash drum in order to supply the necessary added increment of heat, this feature of the process being illustrated more particularly in the example given below.

The manner in which the present invention may be practiced can be illustrated by reference to the figure of the appended drawing which is a simplified flow scheme of a refinery unit adapted for using the process. For the sake of greater clarity, the figure is described below in the example wherein details are given of a gilsonite recovery operation.

*Example*

In this operation, a water (60–70%) gilsonite (30–40%) slurry is supplied to the unit of the figure through line 10 at a temperature of about 40–80° F. This incoming slurry is filtered in filter 11 which may, for example, be of the rotary vacuum type. The water content of the gilsonite mixture is thereby reduced to between 10% and 30%, 18% being taken as a representative figure for the present example. Water filtered from the slurry is discharged from the plant through line 12. The filter cake is charged by means of conveyor line 13 to the slurry mix tank 14 which operates at atmospheric pressure. In the slurry mix tank the cake is intimately admixed with a light oil fraction from line 15 and any heavier oil which may be supplied from line 16, the latter oil being cooled, if desired, before being discharged into tank 14 or admixed with the lighter oil in line 15. Representative temperatures are 190–225° F. for the combined oil stream introduced into tank 14, and about 100–150° F. for the resulting slurry formed in the tank, the quantity of said oil being, for example, about 0.75 pound per pound of the filter cake. Under these conditions a slurry is formed in tank 14 which is picked up by pump 17 and admixed with hot, heavy oil supplied from line 18 for passage through vaporization coil 19 and discharge into water flash drum 20 operated at about 100 p.s.i.g. The temperature of the oil stream from line 18 is approximately 650° F., with the amount thereof employed being such as to bring the resulting mixture in coil 19 to a temperature of approximately 550° F. Under these conditions vaporization of residual water in the gilsonite-oil slurry proceeds smoothly without substantial foaming and therefore without the necessary use of antifoaming agents.

Dry, hot gilsonite-oil solution (which may contain a small residue of solid gilsonite) is withdrawn from drum 20 through line 21 and passed to melt tank 22 wherein complete solution of any remaining gilsonite particles is effected. The gilsonite-oil solution is withdrawn from tank 22 and passed in part through line 23 to coker feed tank 28. The balance of said solution is pumped as recycle through lines 24 and 18 for admixture with the slurry from tank 14, a portion of said recycle stream normally being passed through line 25 and furnace 26 so as to bring the temperature of the heavy oil stream in line 18 to the desired level. If desired, and particularly when the stream in line 21 is free of solid gilsonite particles, the amount of said stream employed as recycle need not be passed through melt tank 22, but may be sent directly to line 24.

The net gilsonite-oil solution in coker feed tank 28 can be processed in any desired fashion. However, in the preferred practice of the present invention the solution is picked up by pump 29 and pumped through line 30 and heat exchanger 31 to a coking unit generally indicated at 32. Coke is removed from unit 32 (as through line 33) while the coker distillate is taken via line 34 to a fractionating column 36. Various relatively light product streams are recovered from column 36, as for example through lines 37 and 38. A portion of the heavy gas oil in line 39 is normally removed from the system shown in the figure, while the balance (preferably at about 650° F.) is recycled through line 40 by pump 42 for admixture with the discharge of furnace 26 and subsequent blending with the discharge from the slurry mix tank 14 in line 19. Likewise, while a portion of the residual stream in line 35 may also be discharged from the particular system shown, said stream is preferably left therein and divided, with a portion being diverted via line 41 for use as a part of the recycle stream in line 40, while the balance is passed through pump 43, line 35, and coker feed heat exchanger 31 before being returned to column 36. As shown in the drawing, a portion of the heavy oil stream in line 40 can be diverted through line 16 for admixture (after cooling, if necessary) with the filter cake in tank 14. Similarly, while not shown in the drawing, similar use may be made of a portion of the light oil in line 38.

The overhead vapor from water flash drum 20, consisting of water plus light oil, flows via line 44 through cooler 45, where it is cooled to about 335° F., a temperature selected to give maximum oil condensation, without condensing any water. The light oil condensate is separated in drum 46 and recycled to tank 14 via lines 47 and 15 and pump 48, while any remaining oil portion not so recycled is sent to column 36 for fractionation and recovery. The overhead vapor from drum 46 flows via line 49 through cooler 50 where it is condensed and passed into skimmer drum 51. A slop oil stream is recovered in drum 51 by decantation and flows through line 52 to storage or other disposal. An oily water stream is also recovered in drum 51 and is removed via line 53 to be disposed of in any convenient fashion. The vent from drum 51 is indicated at 54.

It will be seen from the above description that the method of the present invention provides a simple, though completely effective, means for processing mixtures of water with a normally solid asphaltic material such as gilsonite, whereby the latter product may be recovered in the form of a water-free oil solution which is ready to be worked up in any desired type of conversion unit. Thus, the method is one which facilitates rapid melting of the solid gilsonite or other asphaltic material present without undue deposition of tacky solids on adjacent wall surfaces as the slurry is contacted with a large volume of the hot, heavy oil within a confined zone wherein pumping is impossible and is then discharged into the flash drum. Once the mixture reaches said drum, all water present is effectively removed as a vapor without giving rise to foaming problems, the method also having the advantage that by staging the condensation of said vapors, any oil present therein may be condensed in a first stage and returned to the system, with the water component of the vapors thereafter being condensed in a succeeding stage for discharge from the system.

We claim:

1. A process for separating the asphaltic portion from a mixture of solid particles of an asphaltic material with water, which comprises adding to said asphalt-water mixture a quantity of oil sufficient to provide a pumpable slurry having a temperature below 212° F.; pumping said slurry into contact, in a confined zone, with a circulating liquid medium comprised of hot heavy oil, said oil being supplied at a temperature and in an amount sufficient to bring the temperature of the resulting mixture in said zone into a range of from about 350 to 650° F., and discharging the last-named mixture into a separatory vessel from which the water and light oil components are taken overhead as vapors, and from which a liquid bottoms stream comprised of heavy oil and asphaltic material is recovered as bottoms.

2. The process of claim 1, wherein the asphaltic material is gilsonite.

3. A process for separating the asphaltic portion from a mixture of solid particles of an asphaltic material with from about 10% to 30% water, which comprises adding to said asphalt-water mixture a quantity of oil sufficient to provide a pumpable slurry having a temperature below 212° F.; pumping said slurry into contact, in a confined zone, with a hot, circulating liquid medium comprised of a heavy oil boiling above about 600° F., said oil being supplied at a temperature and in an amount sufficient to bring the temperature of the resulting mixture into a range of from about 350° to 650° F.; discharging the last-named heated mixture into a flash drum from which the water and light oil components are taken overhead as vapors, and from which is recovered a liquid bottoms stream comprised of heavy oil and asphaltic material; and condensing said overhead vapors from the flash drum in stages, the oil components thereof being substantially condensed in a first stage, and the water and any remaining oil being condensed in a succeeding stage.

4. The process of claim 3, wherein the asphaltic material is gilsonite and wherein the light oil condensed in said first stage is recycled at least in part to convert the water-gilsonite feed to a pumpable slurry.

5. The process of claim 4, wherein a portion of the heat required to bring the pumpable slurry to a temperature between 350 to 650° F. is supplied by recycling a heated portion of the liquid bottoms stream from the flash drum.

References Cited in the file of this patent

UNITED STATES PATENTS

| | | |
|---|---|---|
| 654,258 | Ihart | July 24, 1900 |
| 2,730,453 | Jordan et al. | Jan. 10, 1956 |